(12) United States Patent
Anzai et al.

(10) Patent No.: US 7,357,674 B2
(45) Date of Patent: Apr. 15, 2008

(54) MEMORY CARD SOCKET STRUCTURE

(75) Inventors: Tsunehiro Anzai, Watarai (JP); Norimasa Kaji, Tsu (JP); Hiroaki Hayashi, Tsu (JP); Toshihiro Izushima, Matsusaka (JP); Hirohisa Tanaka, Tsu (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 11/512,112

(22) Filed: Aug. 30, 2006

(65) Prior Publication Data
US 2007/0049080 A1 Mar. 1, 2007

(30) Foreign Application Priority Data
Aug. 30, 2005 (JP) .............................. 2005-249829

(51) Int. Cl.
H01R 13/648 (2006.01)
(52) U.S. Cl. ........................ 439/608; 439/159; 439/630
(58) Field of Classification Search ........ 439/630–632, 439/607–608, 159–160
See application file for complete search history.

(56) References Cited

U.S. PATENT DOCUMENTS

| 6,276,944 | B1 | 8/2001 | Klatt |
| 6,540,557 | B1 | 4/2003 | Yu |
| 6,994,573 | B2 * | 2/2006 | Tanaka et al. .............. 439/159 |

FOREIGN PATENT DOCUMENTS

| DE | 29811425 U1 | 9/1998 |
| EP | 1510965 A1 | 11/2000 |
| EP | 1052590 A1 | 3/2005 |
| WO | WO 99/52338 | 10/1999 |

* cited by examiner

Primary Examiner—Truc Nguyen
(74) Attorney, Agent, or Firm—Bacon & Thomas, PLLC

(57) ABSTRACT

A memory card socket structure includes a case having a card accommodating portion for receiving a thin plate-shaped memory card, and a contact block having contact terminals to be brought into contact with terminals of the memory card. The case has a cover shell and a base shell both formed of metal plates, and the cover shell and the base shell are welded to each other by a laser welding.

3 Claims, 6 Drawing Sheets

MEMORY CARD SOCKET STRUCTURE

FIELD OF THE INVENTION

The present invention relates to a memory card socket structure for accommodating a memory card used as a small card-shaped storage medium.

BACKGROUND OF THE INVENTION

Recently, various electronic devices such as a digital camera and a mobile phone have been increasingly equipped with a memory card socket structure for allowing a small-sized storage medium (hereinafter, simply referred to as a 'memory card') such as a Mini SD Memory Card (Registered Trademark) to be inserted thereinto or taken out therefrom.

As one type of such conventional memory card socket structures, there has been proposed one including a case with a substantially rectangular shelled shape (see, for example, Japanese Patent Laid-open Application No. 2004-362892: Reference 1). The case is comprised of two substantially rectangular plate-shaped members, each having a substantially rectangular base and two sidewalls extending from a pair of opposite ends thereof approximately in perpendicular manners. The plate-shaped members are coupled in a manner of which their sidewalls are overlapped on each other, thereby forming the case.

The memory card socket structure disclosed in Reference 1 has an advantage of a high heat radiation effect in that the two members forming the structure are both made of metal plates.

In the memory card socket structure of Reference 1, however, since the members are coupled by being overlapped with their sidewalls, rattling of the case is likely to occur. Further, when the members with different sizes are coupled to each other, there may be gaps generated between connecting portions provided at the sidewalls of the members corresponding to each other, which in turn distort the rectangular shelled shape of the case. As a result, insertion of the memory card would become difficult, and contact failure or deformation of terminals would occur.

SUMMARY OF THE INVENTION

It is, therefore, an object of the present invention to provide a memory card socket structure capable of preventing a rattling of a case or a distortion of the shape of the case.

In accordance with a preferred embodiment of the present invention, there is provided a memory card socket structure including a case having a card accommodating portion for receiving a thin plate-shaped memory card; and a contact block having contact terminals to be brought into contact with terminals of the memory card, wherein the case has a cover shell and a base shell both formed of metal plates, and the cover shell and the base shell are welded to each other by a laser welding.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
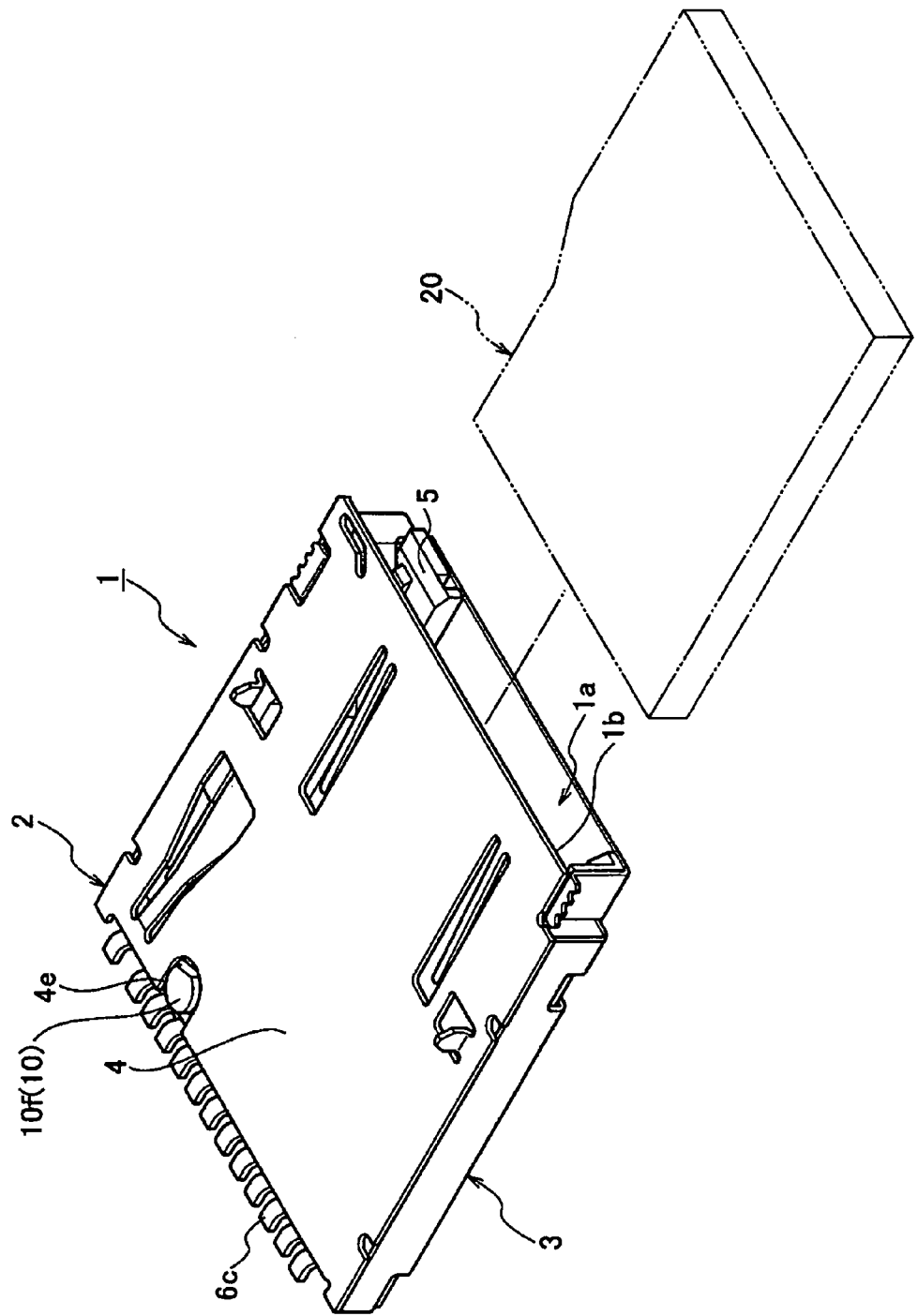
FIG. 1 is a perspective view of a memory card socket structure in accordance with a preferred embodiment of the present invention.
Figure 2:
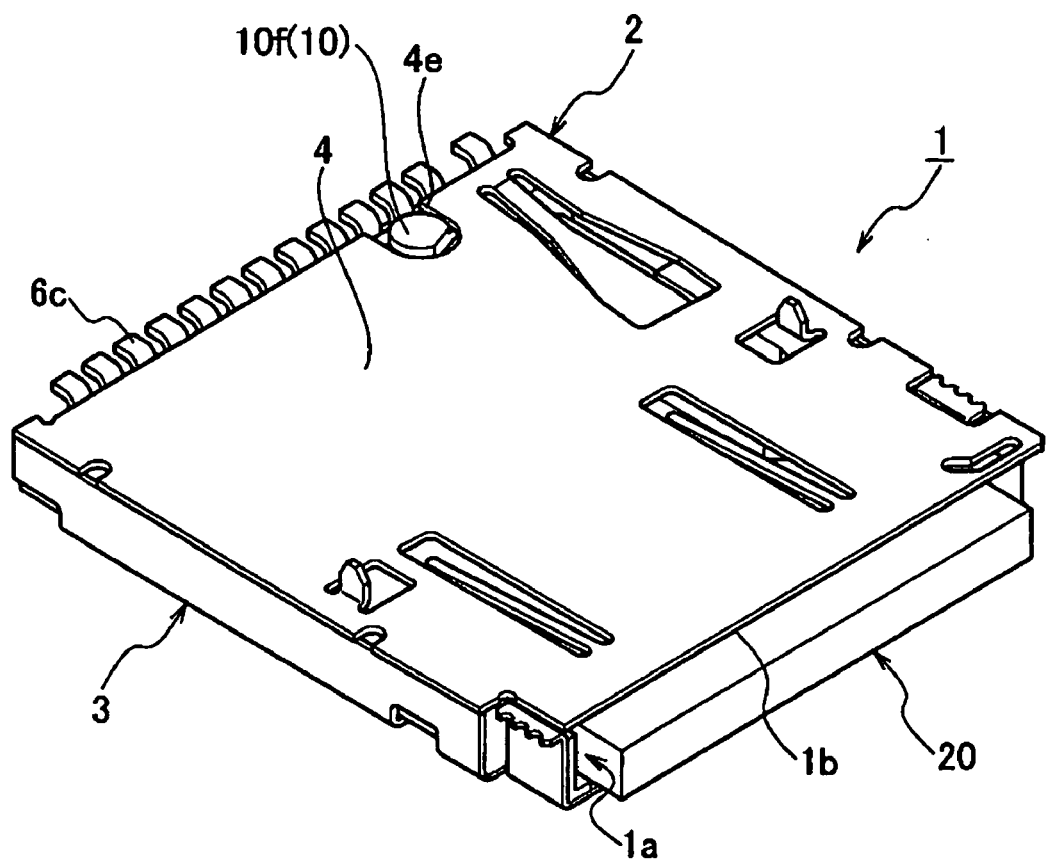
FIG. 2 sets forth a perspective view showing a state in which a memory card is inserted into the memory card socket structure in accordance with the preferred embodiment of the present invention.
Figure 3:
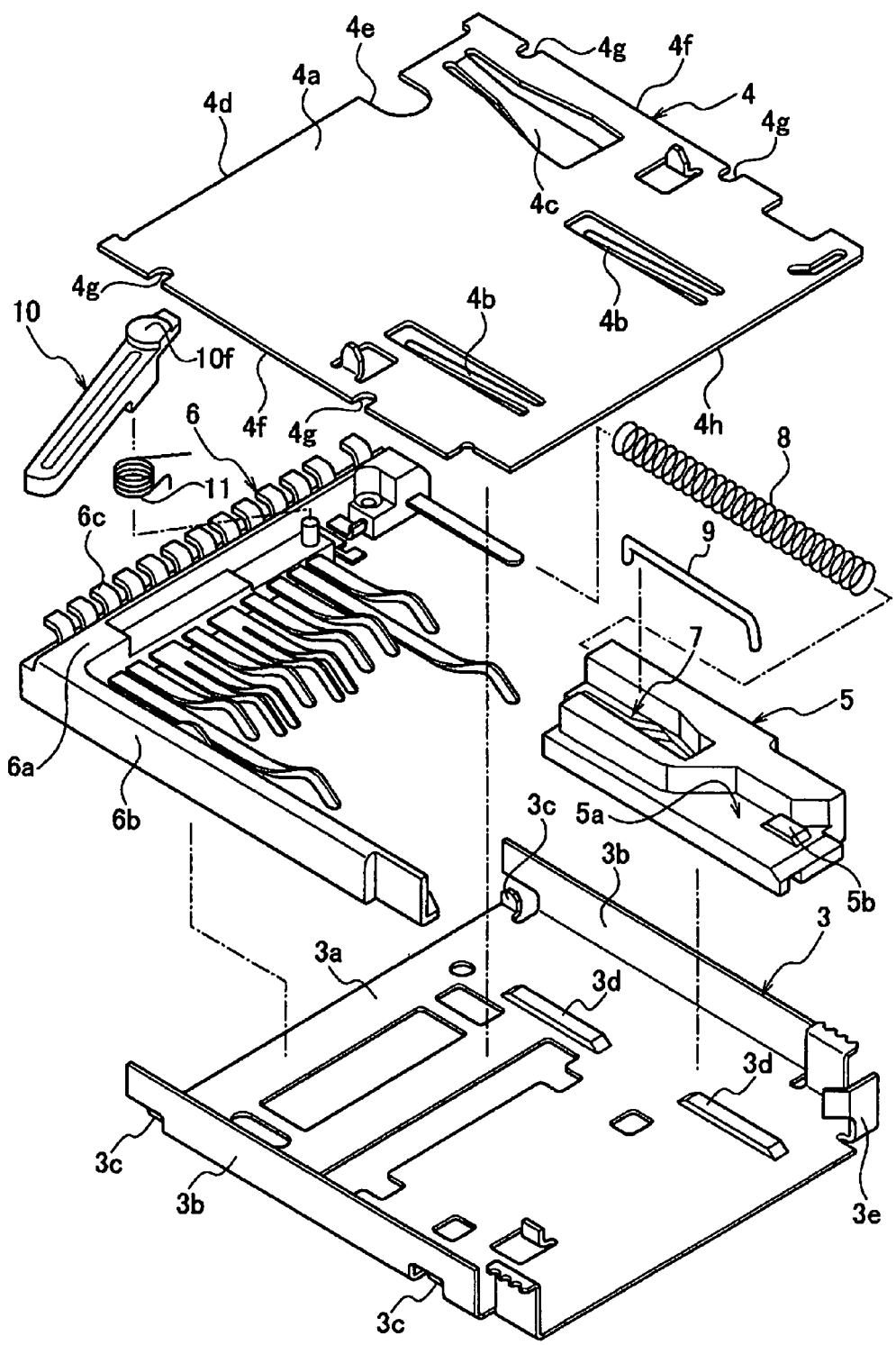
FIG. 3 presents an exploded perspective view of the memory card socket structure in accordance with the preferred embodiment of the present invention.

Hereinafter, preferred embodiments of the present invention will be descried in detail with reference to the accompanying drawings.

A memory card socket structure 1 in accordance with a preferred embodiment of the present invention is disposed at an electronic device (not shown) or the like to serve as a socket for allowing a memory card 20 to be inserted thereinto or taken out therefrom. When the memory card 20 is inserted into the memory card socket structure 1, electrodes (not shown) formed and exposed at a front or a rear surface of the memory card 20 is brought into contact with contact terminals 6c provided in the memory card socket structure 1, i.e., electrically connected, thus making it possible to tranceive data between the electronic device or the like and the memory card 20.

Further, the memory card socket structure 1 is configured to have a so-called push-on and push-off mechanism, in that the memory card 20 can be locked in a preset mounting state by being inserted and pushed into a card compartment 1a of the memory card socket structure 1 through an opening (entrance) 1b thereof, and can be unlocked from the locked state and rejected from the opening 1b of the card compartment 1a by being pushed thereafter.

In general, the memory card socket structure 1 includes a case 2 having a rectangular shelled shape with a substantially plan surfaces and the thin elongated strip-shaped opening 1b at its one side (front side); a slider 5 supported in the card compartment 1a of the case 2 so as to be moved back and forth between the opening 1b side and the rear side of the card compartment 1a; a coil spring 8 serving as a basing mechanism for urging the slider 5 toward the opening 1b side in the card compartment 1a; and a contact block 6 disposed at the rear portion of the card compartment 1a.

The case 2 is an assembly of a base shell 3 and a cover shell 4, each of which is formed by appropriately shaping a thin metal plate such as stainless steel having an electric conductivity and featuring a high thermal conductivity.

The base shell 3 includes a substantially rectangular base 3a and two sidewalls 3b of a certain height formed by bending a pair of opposite end sides of the base 3a approximately in perpendicular manners. Further, a stopper 3e is formed at an opening 1b side of one of the sidewalls 3b such that the stopper 3e is projected toward an inner side of the base shell 3 in a width-wise direction thereof. With the stopper 3e, the slider 5 is prevented from releasing out of the opening 1b. Further, the base 3a has hook portion 3c on which the contact block 6 is hooked to be fastened in its installation position; projection bars 3d elongated in a reciprocating direction of the memory card 20 to guide the slider 5; and so forth.

The cover shell 4 is obtained by forming a plate-shaped member into an approximately rectangular shape. The cover shell 4 has a base 4a provided with spring members 4b punched at plural locations of the base 4a appropriately to press the memory card 20 with a relatively light force, and the base 4a also has a spring structure 4c for pressing a pin 9 to be described later with a relatively light force.

The base shell 3 and the cover shell 4 are coupled to form a substantially rectangular shelled shape by, e.g., laser welding, and one opening of the rectangular shelled structure is closed with the contact block 6, so that the card compartment 1a is formed inside the case 2 to have a substantially rectangular shelled shape having an evenly leveled bottom. The memory card 20 is accommodated in the card compartment 1a. That is, in this preferred embodiment, the card compartment 1a serves as a card accommodating portion.

The slider 5 has recesses (not shown) configured to correspond to the projection bars 3d provided on the base shell 3. Further, by engaging the projection bars 3d with the recesses, the slider 5 is guided to move back and forth along one of lateral edges of the card compartment 1a (i.e., one of the sidewalls 3b of the base shell 3). Further, the slider 5 has a recess portion 5a to be fitted with a corresponding shape provided on a peripheral surface of one side of the memory card 20, and it also has a protrusion 5b to be engaged with a cutoff portion of the memory card 20. If the memory card 20 is inserted into the card compartment 1a in a preset posture, the memory card 20 is configured to engage the cutoff portion with the protrusion 5b of the slider 5 while coming into contact with the recess portion 5a, whereby the memory card 20 is allowed to be moved back and forth in the card compartment 1a while being maintained on the slider 5.

The position of the slider 5 in the card compartment 1a is controlled by the pin 9 whose first end is rotatably fixed at the contact block 6, a groove portion 7 for guiding a second end of the pin 9 along a preset path, and the coil spring 8, interposed between the slider 5 and the contact block 6, for biasing the slider 5 toward the opening 1b side. Specifically, under the condition of forming predetermined steps on the bottom surface of the groove portion 7, the pin 9's second end proximal to the opening 1b side is guided into a desired passage of the groove portion 7 not only by a biasing force of the coil spring 8 and a force of inserting the memory card 20 but also by being biased against the bottom portion of the groove portion 7 from the spring structure 4c provided at the cover shell 4. Further, the groove portion 7's part closed to the opening 1b side can be adapted to be in a substantially heart shape when viewed from the top, forming a so-called heart cam mechanism. Therefore, the above-mentioned push-on and push-off functions of the memory card 20 can be realized.

The contact block 6 has an inner wall 6a and a sidewall 6b made of an insulating resin, wherein the inner wall 6a and the sidewall 6b together form an L-shape when viewed from the top. The contact block 6 is fixed on the base shell 3 such that its inner wall 6a is disposed at the rear side of the card compartment 1a, while its sidewall 6b is disposed at a remaining one of lateral edges of the card compartment 1a (i.e., an edge where the slider 5 is not installed). Further, the hook portion 3c provided at the base shell 3 is used for fixation of the contact block 6.

The inner wall 6a has a plurality of bar-shaped contact terminals 6c penetrating it, wherein the contact terminals 6c are formed of a conductive metal. The contact terminals 6c contact the electrodes (not shown) formed on the surface of the memory card 20 when the memory card 20 is mounted on a preset position in the rear side of the card compartment 1a. By the contact terminals 6c, various data can be transferred between an electronic device (not shown) equipped with the memory card socket structure 1 and the memory card 20. Here, some of the contact terminals 6c are set to be used for, for example, the detection of the memory card 20, rather than contacting the electrodes of the memory card 20. Further, the contact terminals 6c can be fixed to the inner wall 6a by molded inserts or by being inserted through small holes bored through the inner wall 6a.

Figure 4:
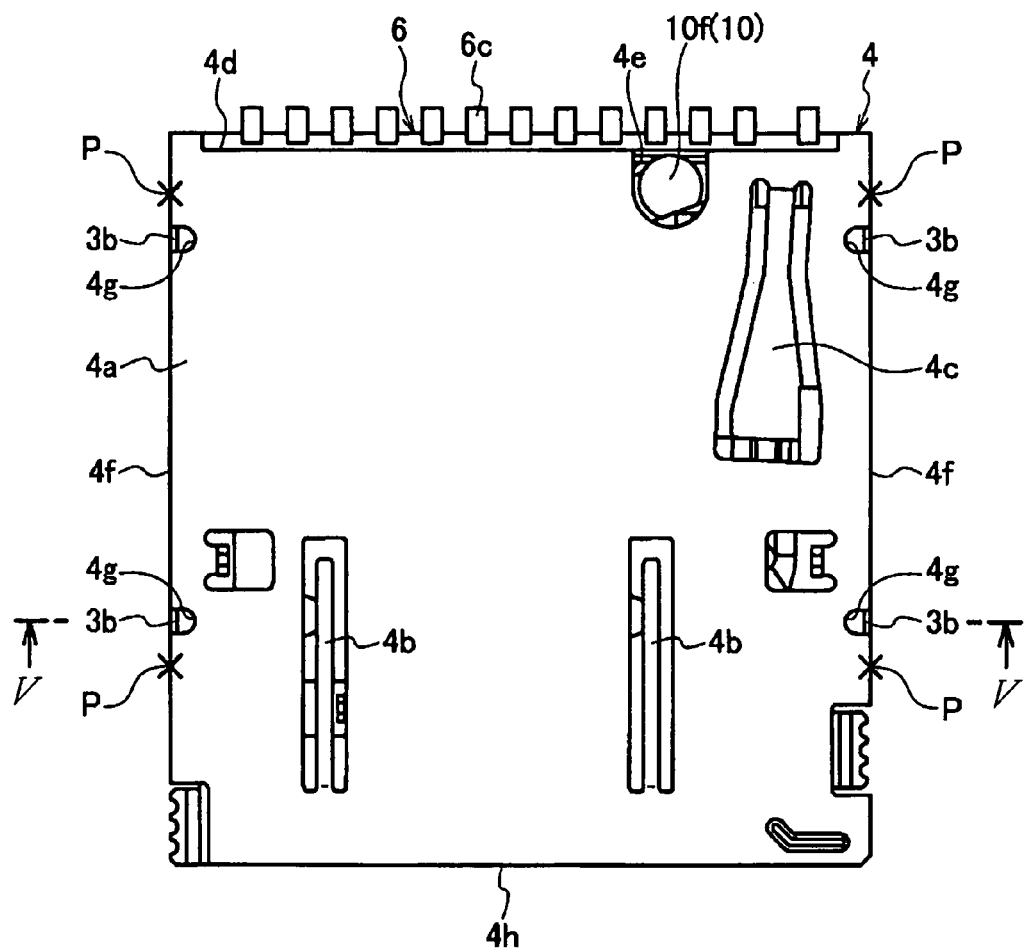
FIG. 4 provides a top view of the memory card socket structure.
Figure 5:
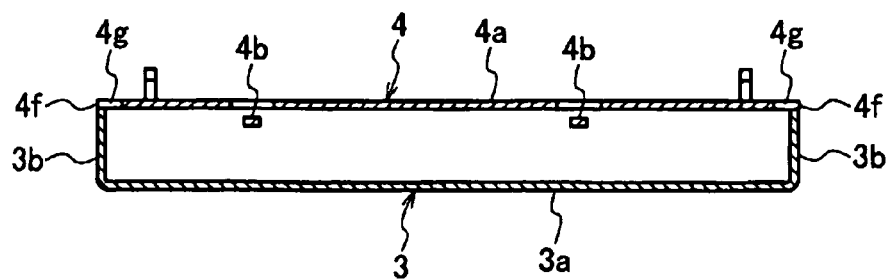
FIG. 5 depicts a cross sectional view (taken along a line V-V of FIG. 4) of the memory card socket structure, viewed from an opening side thereof.

A bar-shaped movable arm 10 is rotatably installed at the inner wall 6a. Further, the movable arm 10 is biased toward the side of the opening 1b by a torsion spring provided between the contact block 6 and a protrusion 10f of the movable arm 10 to be described later, while it is rotatingly pressed toward the rear side of the card compartment 1a through a leading end portion of the memory card 20. Accordingly, when the memory card 20 is yet to be inserted all the way to its mounted position near the rear side of the card compartment 1a and is in a non-engaging relationship with the movable arm 10, the movable arm 10 is fully rotated toward the opening 1b (below, simply referred to as an 'maximum opening 1b-side position'), as shown in FIG. 4. Further, when the memory card 20 is inserted all the way to its mounted position, as shown in FIG. 5, the movable arm 10 is rotated toward the rear side to be located at a rear position of the of the card compartment 1a. That is, the movable arm 10 is rotated between the maximum opening 1b-side position shown in FIG. 4 and the rear position shown in FIG. 5. Further, due to the characteristic of the heart cam mechanism, when the memory card 20 is completely mounted in the card compartment 1a the movable arm 10 and the slider 5 are returned to a position which is spaced apart from the innermost side of the card compartment 1a and slightly towards the side of the opening 1b. Further, a cutoff portion 4e is formed at a rear edge 4d of the cover shell 4, and the protrusion 10f of the movable arm 10f is loosely placed inside the cutoff portion 4e. Therefore, both ends of the movable arm 10 are supported at the cover shell 4 and the contact block 6 via the cutoff portion 4e and the torsion spring 10.

In accordance with the preferred embodiment of the present invention, the cover shell 4 is mounted on the pair of sidewalls 3b of the base shell 3, and edges of the sidewalls 3b of the base shell 3 and edges 4f of the cover shell 4 are welded by a laser welding.

Specifically, as shown in FIG. 4, the laser welding is performed at, e.g., two individual points on each of the edges 4f of the cover shell 4 running in a direction parallel to the insertion and extraction direction of the memory card 20, i.e., at four individual locations (welding spots P) in total.

Also, substantially U-shaped cutout portions 4g are formed at the edges 4f of the cover shell 4, and the edges of the sidewalls 3b are partially exposed through the cutout portions 4g, thus allowing visual checking of the sidewalls 3b from the outside of the cover shell 4.

Further, the welding spots P can be determined with respect to the cutout portions 4g as a reference point. In this preferred embodiment, each welding spot P is located at a position closer to the cutout portion 4g between one of the cutout portions 4g and either one of two opposite edges 4d and 4h of the cover shell 4 running in a widthwise direction (a direction perpendicular to the insertion and extraction of the memory card 20). Further, the welding spots P are located away from the cutout portions 4g by a preset distance.

Moreover, in this preferred embodiment, the distance between the two edges 4f of the cover shell 4 is set to be substantially identical with that between the sidewalls 3b of the base shell 3, as shown in FIG. 5.

As illustrated in FIG. 5, the laser welding is performed while the cover shell 4 is mounted on the sidewalls 3b of the base shell 3. Here, the relative position of the base shell 3 and the cover shell 4 in a direction parallel to the surface of the cover shell 4 is fixed by jigs or the like. In this case, it is preferable that the base shell 3 and the cover shell 4 are connected by the laser welding rather than the mechanical engagement as employed in the prior art.

Figure 6:
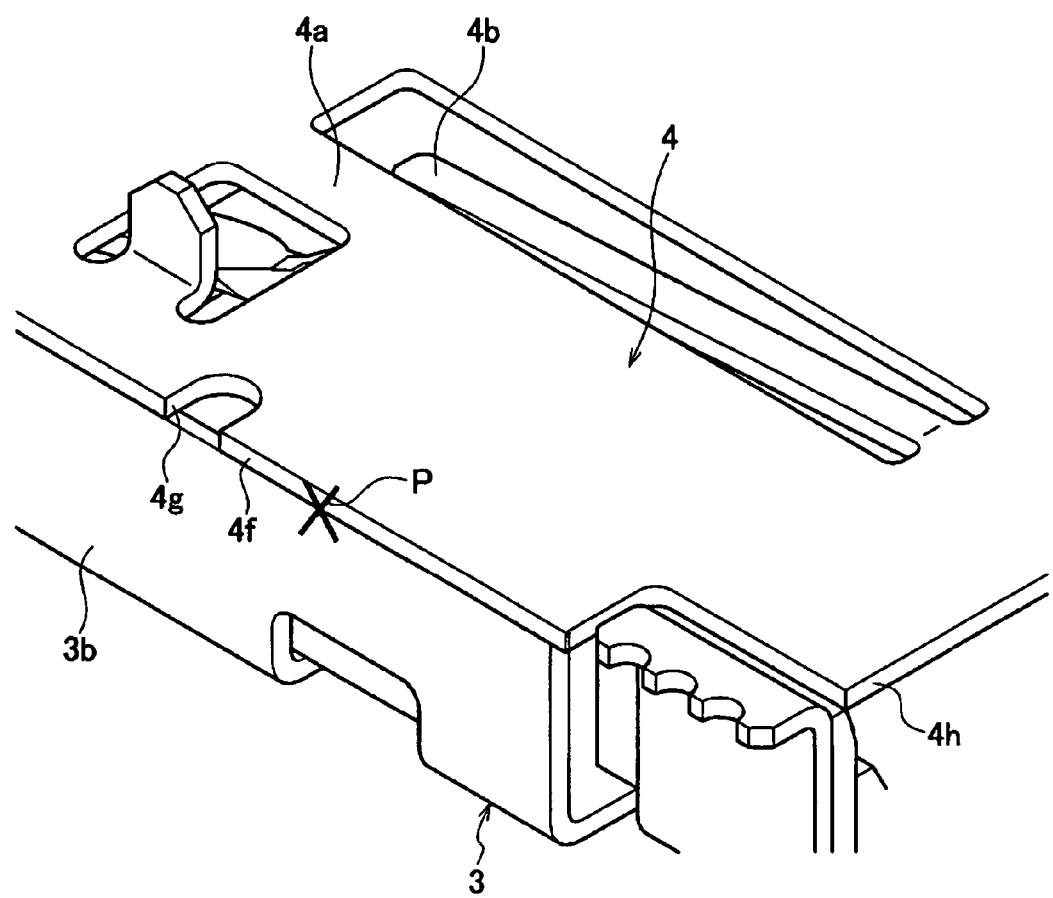
FIG. 6 offers an enlarged perspective view of a vicinity of welding spots of a base shell and a cover shell of the memory card socket structure.

Also, as shown in FIG. 6, a laser beam is irradiated to each welding spot P from diagonally above the base 4a and sidewalls 3b or substantially at the side of them (for example, at an angle of 135° to 170° with respect to the surface of the base 4a and 135° to 90° with respect to the surface of the sidewalls 3b).

Figure 7:
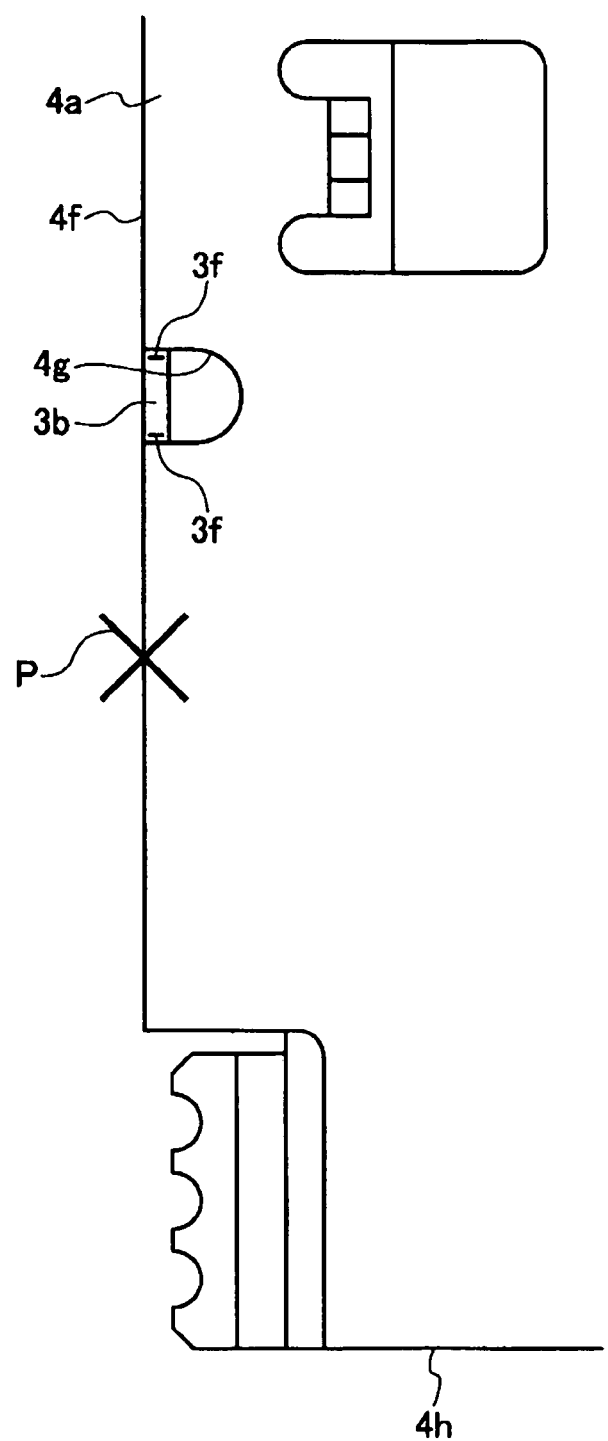
FIG. 7 sets forth an enlarged top view of the vicinity of the welding spots of the base shell and the cover shell of the memory card socket structure in accordance with the preferred embodiment of the present invention.

Further, in this preferred embodiment, as shown in FIG. 7, an appropriate welded condition is said to be a state in which the outer edges of the sidewalls 3b and the edges 4f of the cover shell 4 are attached while forming a straight line. Here, a width-wise deviation between the base shell 3 and the cover shell 4, if any, can be readily checked through the cutout portions 4g. Also, by providing marks 3f on the edges of the sidewalls 3b as shown in FIG. 7 and by observing the marks 3f through the cutout portions 4g, the relative position of the base shell 3 and the cover shell 4 with respect to the insertion and extraction direction of the memory card 20 can also be detected.

In accordance with the preferred embodiment as described above, since the base shell 3 and the cover shell 4 are attached by a laser welding rather than the mechanical engagement, rattling of the base shell 3 and the cover shell 4 is prevented, which may otherwise be possible. Further, a distortion of shape due to differences in size of the base shell 3 and/or the cover shell 4 can also be prevented.

Moreover, in accordance with the preferred embodiment of the present invention, the base shell 3, which includes the substantially rectangular plate-shaped base 3a and the two sidewalls 3b extending from the pair of opposite ends of the base 3a approximately in perpendicular manners, and the cover shell 4, which is formed of the substantially rectangular plate-shaped member, are connected by laser-welding the edges of the sidewalls 3b and the cover shell 4 while maintaining the cover shell 4 on the sidewalls 3b. The case can be reduced in size because the sidewalls of the base shell and those of the cover shell need not be overlapped, unlike in the conventional structure. Also, as the adhesion of the base shell 3 and the cover shell 4 is further enhanced by the laser welding, the heat radiation can be also improved.

In addition, in accordance with the preferred embodiment of the present invention, since the positions of the edges of the sidewalls 3b can be visually checked from the outside of the cover shell 4 through the cutout portions 4g, it can be readily determined whether the connection (connected position) of the base shell 3 and the cover shell 4 is appropriate or not. Further, since the cutout portions 3g can be used as marks for welding spots of the laser welding, work efficiency can be improved.

Though the present invention has been described with respect to the preferred embodiment, it is to be noted that the present invention is not limited thereto but can be varied in various ways.

For example, it is possible to transpose the base shell and cover shell, and the arrangement and the number of the welding spots and the cutout portions can be changed appropriately. Also, the configurations of any other components in the present invention can also be modified.

While the invention has been shown and described with respect to the preferred embodiments, it will be understood by those skilled in the art that various changes and modifications may be made without departing from the scope of the invention as defined in the following claims.

What is claimed is:

1. A memory card socket structure, comprising:
   a case having a card accommodating portion for receiving a thin plate-shaped memory card; and
   a contact block having contact terminals to be brought into contact with terminals of the memory card,
   wherein the case has a cover shell and a base shell both formed of metal plates, and the cover shell and the base shell are welded to each other by a laser welding, and
   wherein the base shell has a substantially rectangular plate-shaped base and a pair of sidewalls extending from two opposite ends of the base approximately in a perpendicular manner, and the cover shell is formed in a substantially rectangular plate shape, and edges of the sidewalls of the base shell and edges of the cover shell corresponding thereto are joined by the laser welding at a state in which the cover shell is mounted on the sidewalls.

2. The socket structure of claim 1, wherein one or more cutout portion is formed at the edges of the cover shell to partially expose the edges of the sidewalls of the shell therethrough.

3. The socket structure of claim 2, wherein marks are provided on the edges of the sidewalls of the base shell and the marks are exposed through the cutout portion.

* * * * *